United States Patent [19]

Twomey

[11] Patent Number: 4,666,186
[45] Date of Patent: May 19, 1987

[54] TUBING

[76] Inventor: Alan Twomey, State Highway 3, Ohaupo, New Zealand

[21] Appl. No.: 855,421

[22] Filed: Apr. 23, 1986

Related U.S. Application Data

[63] Continuation of Ser. No. 585,146, Mar. 1, 1984, abandoned.

[51] Int. Cl.[4] ............................................. F16L 55/00
[52] U.S. Cl. .................................... 285/14; 285/382.2
[58] Field of Search ...................... 285/13, 14, 382.2; 138/42

[56] References Cited

U.S. PATENT DOCUMENTS 3,129,960  4/1964  Schrodt ........................... 285/14 X
3,856,333  12/1974  Cox ................................. 285/14 X
4,403,385  9/1983  Kirk ................................. 285/13 X

FOREIGN PATENT DOCUMENTS 195589  10/1985  New Zealand .

Primary Examiner—Dave W. Arola
Attorney, Agent, or Firm—Abelman Frayne Rezac & Schwab

[57] ABSTRACT

An enhanced surface tube is made from two conduits with the inner conduit having a spiral groove extending inwardly from the outer surface so that the two conduits are connected by the spiral groove. The inner conduit is further provided with a longitudinal groove therein. The construction of the tube is such as to provide a breakdown venting path for fluids between the conduit walls.

3 Claims, 1 Drawing Figure

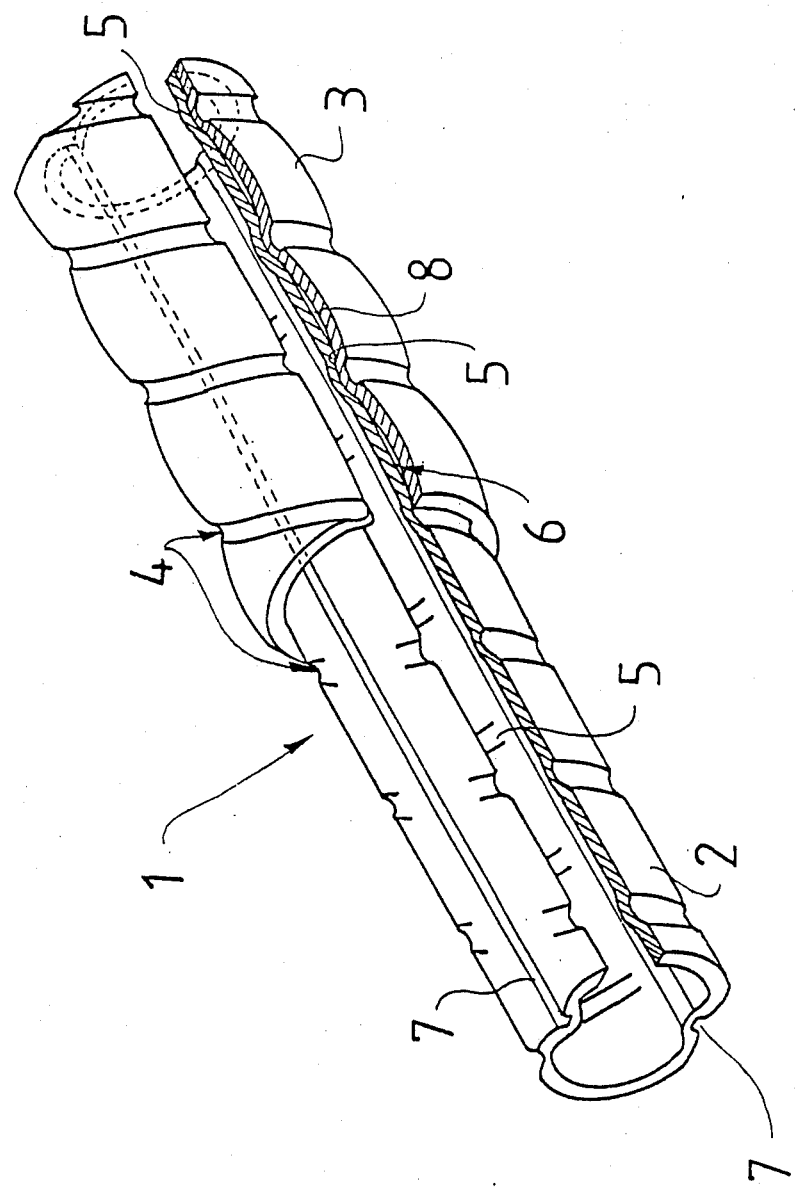

TUBING

This is a continuation of application Ser. No. 585,146, filed Mar. 1, 1984, and now abandoned.

This invention relates to improvements to vented enhanced surface tubing particularly for use in tube-type heat exchangers.

Tube-type heat exchangers are well known and have a variety of uses, one of which allows for the recovery of high grade heat from refrigeration systems for the purpose of heating water. The present invention will be primarily described with this function in mind although the present invention may be used in any application where heat transfer is required between two fluid phases and a thermal differential exists allowing for energy transfer.

In designing energy recovery equipment for use associated with a refrigeration system the normal operating conditions of that refrigeration system must be maintained and such factors as operating compressor head pressure, refrigerant temperature, condensing temperatures and acceptable pressure drops must be designed into the energy recovery system.

The vented enhanced surface spiral tube according to the present invention has been designed to operate effectively particularly to recover high grade heat from a system of such a refrigeration system.

It is highly desirable in any such system to prevent or minimise the possibility of the refrigerant entering the water supply. Clearly such a safety provision is more essential if potable water is being heated. Equally, to protect the refrigeration system, it is necessary to prevent or minimise the likelihood of water entering the refrigerant.

Corrosion is one of the dominant factors which can lead to tube failure. The present invention has also been developed to minimise the impact of corrosion in use.

In New Zealand Patent specification No. 195,589 there is described an enhanced surface tube comprising inner and outer conduits in a close co-operative fit there being a spiral groove extending inwardly from the outer surface of the tube interconnecting the two conduits so that, in use, the conduits act as a single skinned enhanced surface tube. A venting path exists between the inner and outer conduits and in the event of a fracture of either conduit fluids passing over or within the tube can pass via the venting path and be released without a mixing of fluids taking place. For some applications, however, it is considered that the venting path should be larger so that venting can take place at a lower pressure than was hitherto possible.

It is an object of the present invention to provide an enhanced surface tube substantially of the type described but with an enlarged venting path.

Further objects and advantages of the present invention will become apparent from the ensuing description which is given by way of example.

Accordingly the invention consists of an enhanced surface tube comprising an inner conduit and an outer conduit in a close co-operative fit with said inner conduit, a spiral groove in said tube forming a radially inwardly extending protuberance on the inner surface of said inner conduit and at least one longitudinal groove in said inner conduit the arrangement and construction being such that the inner and outer conduits are interconnected and the co-operation of the conduits is such that there is provided a venting path for a fluid between the conduits.

One preferred form of the present invention will now be described with reference to the accompanying drawing which is an isometric section drawn through a vented double wall enhanced surface tube.

The enhanced surface tube generally indicated by arrow 1 consists of an inner conduit 2 preferably of stainless steel, an outer conduit 3 in close cooperative fit with the inner conduit 2. The outer conduit 3 normally will be a copper conduit but it can be formed from any material compatible with the inner conduit. It would be feasible for the conduit 3 also to be formed as a stainless steel tube. Clearly in selecting the conduit 3 the operating conditions would need to be considered and a material selected which was also compatible with the fluid phase passing thereover in the heat transfer system. Normally we have found copper to be the most acceptable conduit for use on the outer skin of the enhanced tube.

The tube 1 should be formed so that there is a sliding fit between the inner conduit and the outer conduit 3. It is important to ensure that when the tube is completed a path is left which will allow for venting between the conduits and that a vent path is open to the atmosphere in whatever system it is fitted. The dimensions required to achieve this end will vary depending on the operating conditions and the material and by way of example at 20 degrees C. the mean free path between the conduits should be between 0.13 mm and 0.25 mm. It is clear that the operating criteria will be controlled at the lower level to ensure that the venting can take place without a very high pressure and at the upper level that the conduits are close enough together so that there is no significant air gap between them. With this in mind an air gap in excess of 0.5 mm should in most circumstances be avoided.

The inner conduit is prereably provided by a stainless steel of ATSA type 302, 303, 304 or 316 and preferably 316 having a wall thickness of 0.5 mm to 1 mm and preferably 0.7 mm.

The outer conduit which may be in copper having a high purity which will ensure that it can be subsequently coiled or otherwise processed without splitting or failing. The copper should have a wall thickness between 0.7 mm to 1.5 mm and preferable 0.91 mm.

According to the present invention there is provided a spiral groove generally indicated by arrow 4 in the tube forming inwardly radially extending protuberances 5 in the inner surfaces of the conduits the arrangement being such that the inner and outer conduits 2 and 3 are interconnected and the cooperation of the conduits is such that there exists a venting path generally indicated by arrow 6 between the conduits. In the present case the venting path 6 is enlarged by the provision of one or more longitudinal grooves 7 in the inner conduit 2. In the example illustrated two such grooves 7 are provided however it is to be appreciated that the number of grooves 7 may depend on venting requirements for a particular application.

Initial construction of the tube 1 is by way of forming two longitudinal grooves 7 1 mm × 1 mm in the inner stainless steel conduit 2. The formation of the grooves 7 causes a 1 mm flattening of the inner conduit 2 such that the subsequent spiralled groove 4 is not continuous around the circumference of the conduit 2. The effect of the flattening is to increase the cross sectional area of the venting path 6 reducing the pressure required to vent any leakage of a fluid from inside or outside the tube 1.

To complete the tube 1 a spiral groove 4 is formed therein using a spiralling head which forms a depression extending in from the outer surface of the outer conduit 3 and by cooperation and pressure against the inner conduit 2 creates a spiral protuberance 5 which is less pronounced than the depression extending in from the outer surface but still will operate to generate turbulence within a flow passing through the conduit in use. In the example illustrated a single start spiral is shown but it would be possible to have a multi start spiral.

The formation of the spiral groove 4 causes the wall of the groove in the outer conduit 3 to be pressed into cooperation against the inner conduit 2 and also for the outer conduit to be thinned relative to the remainder of the conduit. The gap 8 which is exaggerated in the drawing thus is connected to the longitudinal groove 7 providing the venting to the end of the tube. We have found that to achieve venting which is practical in use the formed tube should allow venting to take place at 20 degrees C. when a water pressure 12 to 14 kPa is applied at one end of the tube and the centre conduit is blocked. It will thus be seen that in use in the preferred application with water passing through the conduit 2 and refrigerant over the outer surface of the conduit 3 a failure of the conduit 2 will cause water to leak through the venting path and be visible at the end of the tube, or, the refrigerant to leak out to atmosphere resulting in a drop of refrigerant pressure which will be recorded on the refrigerant monitoring and control equipment. A failure in either wall will not allow a mixing of the refrigerant and water and it would be practically extremely unlikely for there to be a failure in both conduits at the same time. In this way the vented enhanced surface tube provides a means of heating potable water which will satisfy safety criteria and standards.

The efficiency of the present tube is not significantly less than that which may be achieved using a single wall copper tube. In Table 1 details are set out with the percentage of heat transfer recorded showing a tube according to the present invention against a copper tube have a wall thickness substantially the same as the composite tube.

It is considered that while not critical it is desirable for the spiral groove 4 to have a pitch of between 8 mm and 15 mm and preferably 11 mm with the width of the groove between 2 mm and 4 mm and preferably 3 mm and a depth of between 1 mm and 2 mm preferably 1.5 mm. The dimensions selected for the groove are considered to be of significance in that the flow characteristic of the refrigerant over the conduit 3 has induced therein a sufficient turbulence to create optimum or near optimum termperature conditions adjacent the interface between the two fluids. This condition would not be reproducible where deep grooves were used. It must also be recognised that the tube is required to operate through a wide range of heat differential and overall it is undesirable to have deeper grooves which can create pockets allowing for the aocumulation of a lower temperatured refrigerant than might otherwise be available.

The internal conduit has a spiral 4 which because of the physical transmission through the two skins does have a lesser protuberance but it is still sufficient to induce a turbulence in the flow of fluid, normally water, through tube 2. This will prevent coring and again produce the water at the optimum temperature adjacent to the wall of the conduit 2 for heat transfer. It is thought the heat transfer using the tube according to the present invention results from the conditions created whereby the refrigerant medium and the water are caused to contact their respective faces of the conduits 3 and 2 at or near the optimum temperatures for heat transfer. This tends to minimise the impeding heat transfer characteristics which may otherwise be thought to exist as a consequence of the selection of stainless steel and the provision of the air gap over at least a significant percentage of the conduit area. Practical experience has demonstrated as is shown in Table 1 that the vented enhanced surface tube according to the present invention is not significantly less efficient than that able to be achieved using a comparable tube of copper.

TABLE I

| | Flow Rate Liters/hr for 3 HP Compressor | | | |
| --- | --- | --- | --- | --- |
| | 30 | 72 | 182 | 190 |
| | Percentage of Energy Recovered | | | |
| Tube according to present invention (S/Cu) | 53 | 62 | 74 | 79 |
| Equivalent copper tube | 56 | 65 | 76 | 80 |

It is a characteristic of the tube according to the present invention that it allows for a rapid heat transfer in the desuperheating phase and this results in a longer contact time between the refrigerant and the tube surface for the transfer of latent heat. The extent to which this function occurs is related to the type of refrigerant, the operating conditions of the refrigeration system, the water inlet temperature and the water flow rate. For various combinations of these components U factors for the desuperheating and condensing phase have been calculated. The U factors so derived have been found to be some twofold greater than those expected from theoretical film factors. Typical examples calculated from experiments using refrigerant R12 in a (7200 k cal/hr (2.4 ton)), coplematic refrigerator system operating at 0 degrees C. with water flow rates of 1.9, 5.7 and 11.4 liters per minute and an inlet temperature of 18 degrees C. are given in Table II:

TABLE II

| Flow rate (l/min) | 1.9 | 5.7 | 11.4 |
| --- | --- | --- | --- |
| Ush (W/m$^2$/°C.) | 477 | 505 | 522 |
| Uc (W/m$^2$/°C.) | 1550 | 1953 | 2146 |
| Final Water Temp (°C.) | 52 | 40 | 32 |

When used experimentally in a refrigeration system of 11,450 kcal/hr capacity in which the surface area of exchange surfaces is at the limit of capacity the following U factors were obtained as illustrated in Table III:

TABLE III

| Water flow rate (l/min) | 1.9 | 5.7 | 11.4 |
| --- | --- | --- | --- |
| Ush (W/m$^2$/°C.) | 670 | 738 | 760 |
| Uc (W/m$^2$/°C.) | 1550 | 1953 | 2146 |
| Final Water Temp (°C.) | 56 | 41 | 33 |

Aspects of the present invention have been described by way of example only and it will be appreciated that modifications and additions thereto may be made without departing from the scope of the present invention as defined in the appended claims.

I claim:

1. An enhanced surface tube comprising an inner conduit and an outer conduit in a close cooperative fit with the outer surface of the inner conduit, a spiral groove extending inwardly into said tube and forming a radially inwardly extending protuberance on the inner surface of the tube, the pitch spacing of adjacent spirals of said groove being appreciably in excess of the width of said groove, and at least one continuous axially extending groove extending radially inwardly into said inner conduit, the arrangement and construction being such that the inner and outer conduits are interconnected in heat transfer relationship only at said spiral groove, and the cooperation of the conduits is such that there is provided a venting path for a fluid between the conduits, said venting path being defined by said continuous axially extending groove and a circumferentially and axially extending space which exists between the adjacent spirals of said spiral groove in each of the conduits.

2. An enhanced surface tube as claimed in claim 1 wherein the inner conduit is provided with two opposed said continuous axially and radially inwardly extending grooves therein.

3. An enhanced surface tube as claimed in claim 1 wherein the axially and radially inwardly extending groove of the inner conduit is formed in such a manner that the outer surface of the inner conduit is flattened on opposite sides of the axially and radially inwardly extending groove to facilitate communication between said spiral space and said axially and radially inwardly extending groove.

* * * * *